Figure 1:
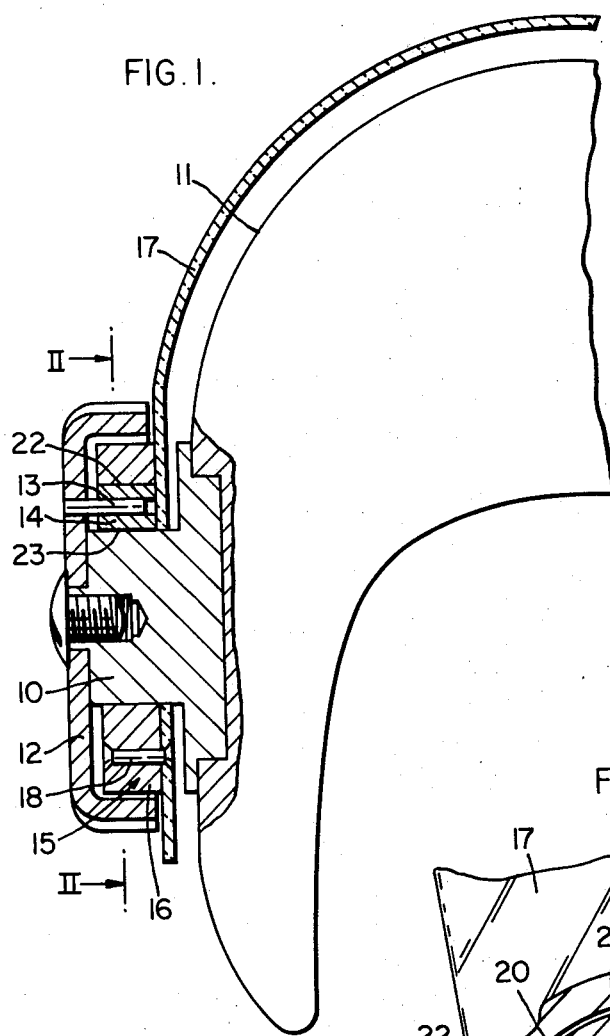

United States Patent [19]

Higgs

[11] 4,170,792
[45] Oct. 16, 1979

[54] POSITION LOCKING DEVICE FOR VISOR ON A HELMET

[75] Inventor: Victor W. Higgs, Staines, England

[73] Assignee: The Secretary of State for Defence in Her Britannic Majesty's Government of the United Kingdom of Great Britain and Northern Ireland, London, England

[21] Appl. No.: 824,112

[22] Filed: Aug. 12, 1977

[30] Foreign Application Priority Data

Aug. 13, 1976 [GB] United Kingdom ............... 33862/76

[51] Int. Cl.² ........................... A42B 3/00; A61F 9/04
[52] U.S. Cl. ............................................ 2/10; 2/6
[58] Field of Search ......................... 2/10, 6, 424, 8; 192/8 R; 74/527

[56] References Cited

U.S. PATENT DOCUMENTS

| | | | |
|---|---|---|---|
| 2,583,428 | 1/1952 | Houplain | 192/8 R |
| 2,597,798 | 5/1952 | Houplain | 192/8 R |
| 3,636,565 | 1/1972 | Luisada et al. | 2/6 |

Primary Examiner—Peter Nerbun
Attorney, Agent, or Firm—Cushman, Darby & Cushman

[57] ABSTRACT

A positioning device, particularly applicable to positioning a visor on a helmet comprising a clutch output member, a datum member, and a clutch input member, the output member constrained to move along a particular path with respect to the datum member, usually an arcuate path, and the output member containing the input member and detent members at either side of the input member which lock the output member to the datum member until released only by movement of the input member which drives the output member to another locked position.

4 Claims, 5 Drawing Figures

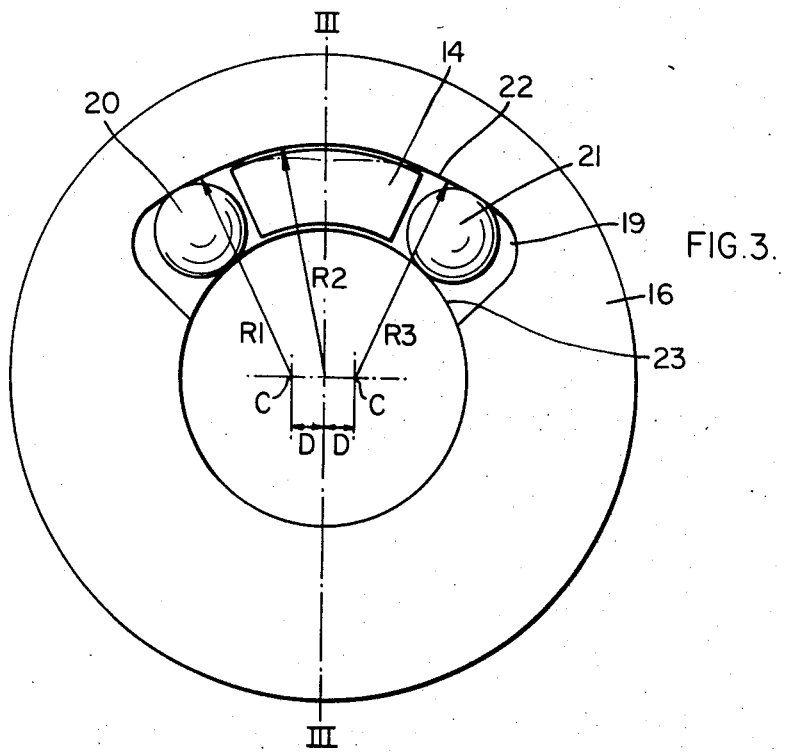
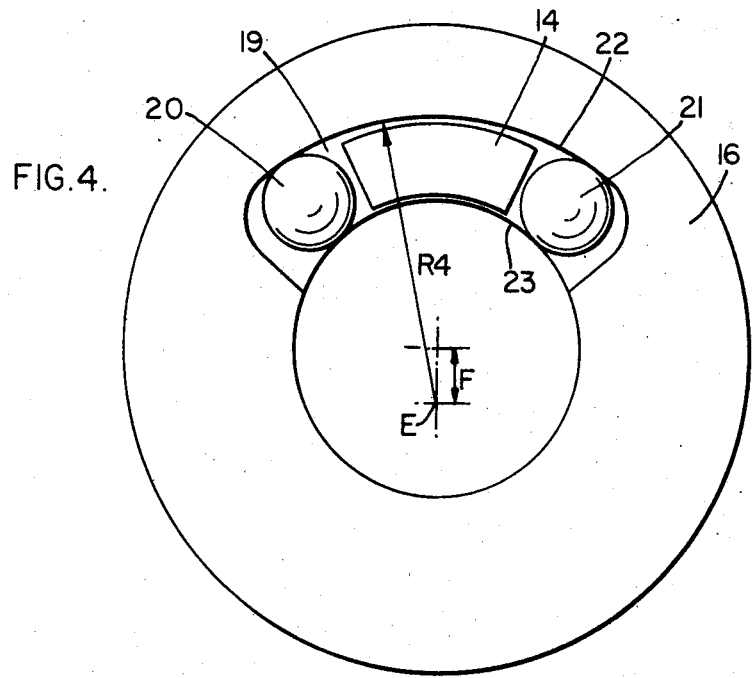

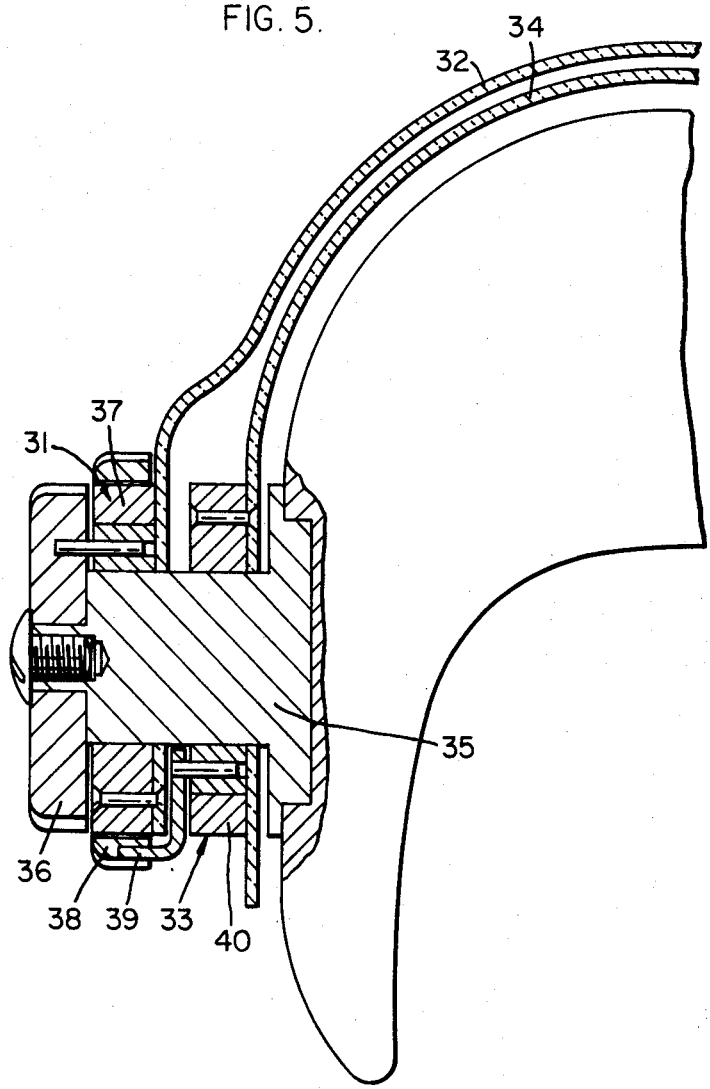

POSITION LOCKING DEVICE FOR VISOR ON A HELMET

The present invention relates to an adjusting and locking device, and particularly to an adjusting and locking device for the positioning of a visor on a helmet.

Typical adjusting and locking devices have hitherto included indexing mechanisms and screw clamp mechanisms. Both of these have the disadvantage that adjustment is a two handed process. One hand is required for adjustment control while the other is required to operate either a pawl or a clamping nut. In the case of helmet visors, since visors are generally worn by persons operating aircraft or vehicles this two handed operation may be particularly hazardous.

In the indexing mechanism which may for example include a ratchet and pawl device, adjustment is restricted to a number of discrete positions. Apart from being merely disadvantageous this can be rather irksome to the wearer of a helmet/visor combination.

Screw clamp mechanisms are apt to entail both clamping difficulties and a difficulty of accurately setting the visor.

According to the present invention an adjusting and locking device comprises a datum member, clutch input member and clutch output member, the clutch output member constrained to move in either direction along a particular path with respect to the datum member, the clutch output member also having a recess containing the clutch input member and two spring loaded detent members one at each side of the clutch input member, the clutch output member recess having walls tapering with respect to the datum member outward away from the clutch input member whereby the detent members normally jam between the tapering walls and the datum member, and lock the clutch output member to the datum member, and the clutch input member is operable in either direction along the particular path to release the detent members and thereafter drive the clutch output member to another position along the path.

The detent members may for example be roller or ball bearings.

According to a feature of the present invention the adjusting and locking device may be arranged for adjusting and locking the clutch output member with respect to angular motion on a circular path, with the datum member and the clutch output member coaxial.

According to a further feature of the invention the datum member may form a supporting boss.

The present invention is particularly applicable to helmets which incorporate a single or double visor. Thus a single-visor helmet may include an adjusting and locking device in accordance with the present invention wherein the clutch member is attached to the visor and the datum member is attached to the helmet. In a double-visor helmet two adjusting and locking devices may be used, each having a common datum member attached to the helmet and wherein the visors are attached one to each clutch output member. Alternatively, the adjusting and locking devices may be mounted one to each side of the helmet, one for each visor, each visor having one side attached to a clutch output member and the other side freely rotatable on a supporting boss.

The present invention can be applied to perambulator or car hood, and to shop and garden shades.

Thus a perambulator or car hood assembly may incorporate an adjusting and locking device according to the invention wherein the clutch output member is attached to the hood and the supporting boss is attached to the body of the perambulator.

The present invention can also be applied to the tiller of a small boat wherein, in use, the clutch output member is adapted to be attached to the tiller and the datum member is adapted to be attached to the boat.

Devices in accordance with the invention are also applicable to throttle and valve assemblies.

Although the adjusting member may be of circular section with means such as knurls to facilitate gripping on operation, other shapes, including a lever may be preferred.

Figure 2:
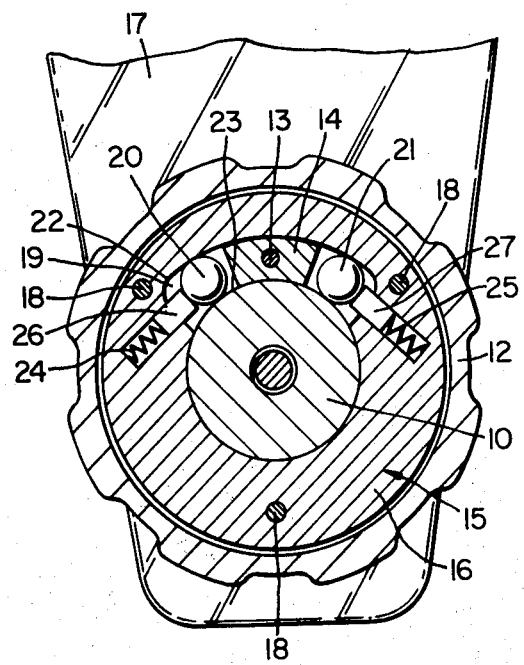

An adjusting and locking device, as applied to visor helmets, and in accordance with the invention will now be described by way of example with reference to the accompanying drawings of which:

FIG. 1 shows a cross-section of a single visor adjustment and locking device as attached to a helmet, FIG. 2 is a view on II—II of FIG. 1, FIG. 3 is a schematic diagram of the clutch assembly, FIG. 4 is a schematic diagram of an alternative form of clutch assembly, and FIG. 5 shows a cross-section of a two-visor adjustment and locking device.

Referring to FIG. 1 and FIG. 2 single adjustment and locking device has a supporting boss 10 rigidly attached to a helmet 11. An adjusting knob 12 is rotatably mounted on the supporting boss 10. The adjusting knob 12 is drivably associated, via a pin 13, with a clutch input member 14 forming part of a clutch assembly 15.

The clutch assembly 15 comprises a clutch output member 16 rotatably mounted on the supporting boss 10 and rigidly attached to a visor 17 by rivets 18. The clutch output member 16 has a cut-out 19 housing detents in the form of roller bearings 20 and 21. The dimensions of the cut-out 19 are such that the roller bearings 20 and 21 may become wedged between a surface 22 of the cut-out 19 and a surface 23 of the supporting boss 10. The clutch output member also has compression springs 24 and 25 housed therein which act on slidably mounted inserts 26 and 27 causing a wedge locking action between the roller bearings 20 and 21 and the surfaces 22 and 23, thus locking the clutch assembly 15 with respect to the supporting boss 10.

Referring to FIG. 3 the surface 22 is formed on three equal radii R1, R2 and R3, of which radii R1 and R3 are struck from centers C at distances D from the center line III—III such that the surfaces 22 and 23 diverge from each other in the area of the bearings 20 and 21. The radii R1 and R2 are so dimensioned that when each of the roller bearings 20 and 21 engages simultaneously with the surfaces 22 and 23, a small clearance remains between them and the clutch input member 14.

An alternative design of cut-out 19 is shown in FIG. 4 in which the surface 22 is formed on a single radius R4 which is struck from a center E at a distance F below the center of the clutch assembly.

Referring to FIG. 2, to unlock the visor 17 and to adjust it in a clockwise direction a clockwise torque is applied manually to the adjusting knob 12. This torque is transmitted through the pin 13 causing the clutch input member 14 to rotate and contact the roller bearing 21. The clutch input member 14 acts on the roller bearing 21 exerting a force against it which is proportional to the applied torque. When this force is sufficient to overcome the residual friction existing between the surface of the roller bearing 21 and the surfaces 22 and 23, the roller bearing 21 is urged against the insert 27 compressing the spring 25. In moving against the insert 27 the roller bearing 21 ceases to be simultaneously engaged with the surfaces 22 and 23, and as a result the wedge locking action of the roller bearing 21 on the clutch output member 16 no longer maintains.

No locking action occurs at the roller bearing 20 since in the area of that bearing the surfaces 22 and 23 effectively diverge with respect to clockwise motion, and wedge-locking action is not effective.

The clutch output member 16 is free to rotate in a clockwise direction about the support boss 10, and the visor 17 may be adjusted to the required position. When this required position is achieved the applied torque is removed from the adjusting knob 12 and the visor 17 locked with respect to the helmet 11. Any clockwise torque applied through the visor 17 is transmitted to the clutch output member 16 which is prevented from rotating by the wedge-locking action of roller bearing 21 on surfaces 22 and 23.

Heretofore only the clockwise rotation of the visor 17 has been described but it will be appreciated, in view of the symmetrical nature of the clutch assembly 15, that the same considerations exist in respect of anti-clockwise rotation.

The two-visor adjustment and locking system as shown in FIG. 5, comprises a first adjustment and locking device 31 fixed to an outer visor 32, and a second adjustment and locking device 33 fixed to an inner visor 34, both devices having a common supporting boss 35.

The first adjustment and locking device 31 is substantially as described for the single visor adjustment and locking device except for a first adjusting knob 36 which does not overlap a first clutch assembly 37.

In the second adjustment and locking device 33 a second adjusting knob 38 is rotatably mounted on the outer surface of the first clutch assembly 37. The adjusting knob has an arm 39 which is connected to a second clutch assembly 40 in a similar manner to that described for the single visor adjusting and locking device.

The clearance between the first clutch assembly 37 and the second adjusting knob 38 is such that the torque induced in the second adjusting knob 38 by movement of the first clutch assembly 37 is insufficient to actuate the detent override member of the second clutch assembly 40.

In operation the outer visor 32 is adjusted by applying a torque, in the required direction, to the first adjusting knob 36, and the inner visor is similarly adjusted by applying a torque to the second adjusting knob 38. The mechanism of adjustment and locking being as described for the single adjustment and locking device.

It will be appreciated that the above embodiments are described by way of example and that the invention can be realized in many different forms. Also it is unnecessary for the adjusting knob to be of full circular section since a suitable mounted sector forming part of the clutch input member could instead be used.

The device is applicable to a broad range of helmet types, such as motor cycle helmets, various military helmets, including those used in bomb disposal, and industrial helmets used by miners and welders.

For that matter, the use of the device need not be confined to a helmet since it can also be applied to the hood of a perambulator or car. A modified form of the device could be incorporated in the tiller of a small boat, this being particularly useful when circumstances required the boats rudder to be periodically fixed at selected settings. Similarly a modified form of the device could also be applicable to rotary type valves. The device is also applicable to reclining seats and seats which are "fixed" to the floor which require adjustment with respect to that floor.

I claim:

1. A visor and helmet assembly comprising an adjusting and locking device, the said device having a supporting boss attached to said helmet, and a clutch output member attached to said visor and rotatably mounted on said supporting boss, a clutch input member contained in a yoke formed on said clutch output member and two spring-loaded detent members also contained in the yoke one at each side of said clutch input member, said clutch output member yoke having walls tapering with respect to said supporting boss outward away from said clutch input member, said detent members operable normally to jam between the tapering walls and said supporting boss and to lock said clutch output member, and said clutch input member operable in either direction about said supporting boss to release said detent members and thereafter to drive said clutch output member and said visor to another position.

2. A double-visor and helmet assembly comprising a first visor and a second visor, and a first and second adjusting and locking device attached to said first and second visor respectively, each of said adjusting and locking devices having a clutch output member attached to said first or second visor, and each clutch output member rotatably mounted on a common supporting boss attached to the helmet, a clutch input member contained in a yoke formed on said clutch output member and two spring-loaded detent members also contained in the yoke one at each side of said clutch input member, the clutch output member yoke having walls tapering with respect to said supporting boss outward away from said clutch input member, and detent members operable normally to jam between the tapering walls and said supporting boss and lock said clutch output member, and said clutch input member being operable in either direction about said supporting boss to release said detent members and thereafter to drive said clutch output member and first or second visor to another position.

3. A double-visor and helmet assembly comprising a first visor and a second visor attached to a first and second adjusting and looking device respectively, each of said adjusting and locking devices mounted on opposite sides of said helmet and having a supporting boss attached to said helmet, a clutch output member rotatably mounted on the supporting boss and attached to said first or second visor, a clutch input member contained within a yoke on said clutch output member, two spring-loaded detent members also contained within the yoke one at each side of said clutch output member, said yoke having walls tapering with respect to said supporting boss outward away from said clutch input member, said detent members being operable normally to jam between the tapering walls and said supporting boss and to lock said clutch output member, and said clutch input member is operable in either direction about said supporting boss to release said detent members and thereafter drive said clutch output member and said first or second visor to another position.

4. A double-visor and helmet assembly as claimed in claim 3 and wherein the un-attached side of said first visor is freely rotatable about said supporting boss of said second adjusting and locking device and the un-attached side of the said second visor is freely rotatable about said supporting boss of said first adjusting and locking device.

* * * * *